(12) United States Patent
Fujikawa et al.

(10) Patent No.: US 7,386,022 B2
(45) Date of Patent: Jun. 10, 2008

(54) LASER BEAM TRANSMITTER

(75) Inventors: Shuichi Fujikawa, Tokyo (JP);
Takafumi Kawai, Tokyo (JP); Keisuke Furuta, Tokyo (JP); Masaki Seguchi, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 174 days.

(21) Appl. No.: 10/545,614

(22) PCT Filed: Mar. 17, 2003

(86) PCT No.: PCT/JP03/03133

§ 371 (c)(1),
(2), (4) Date: Aug. 16, 2005

(87) PCT Pub. No.: WO2004/084364

PCT Pub. Date: Sep. 30, 2004

(65) Prior Publication Data

US 2006/0153258 A1    Jul. 13, 2006

(51) Int. Cl.
*H01S 3/04* (2006.01)
(52) U.S. Cl. ............................. 372/35; 372/34; 372/36
(58) Field of Classification Search ............. 372/34–36
See application file for complete search history.

(56) References Cited

U.S. PATENT DOCUMENTS

| 5,311,528 A * | 5/1994 | Fujino ........................ 372/35 |
| 5,636,239 A | 6/1997 | Bruesselbach et al. |
| 5,661,738 A * | 8/1997 | Yasui et al. .................... 372/35 |
| 5,838,712 A | 11/1998 | Kraenert et al. |
| 6,937,629 B2 * | 8/2005 | Perry et al. .................... 372/35 |
| 2001/0004368 A1 * | 6/2001 | Akagi ........................ 372/35 |
| 2003/0161365 A1 * | 8/2003 | Perry et al. .................... 372/35 |
| 2004/0240496 A1 * | 12/2004 | Fujikawa et al. ............. 372/34 |

FOREIGN PATENT DOCUMENTS

| DE | 195 48 635 A1 | 6/1996 |
| DE | 195 15 635 A1 | 10/1996 |
| DE | 195 15 704 A | 10/1996 |
| JP | 11-163446 A | 6/1999 |
| JP | 11-214773 | 8/1999 |
| JP | 11-214786 A | 8/1999 |
| JP | 2000-277837 A | 10/2000 |
| JP | 2001-177170 | 6/2001 |
| JP | 2001-185791 | 7/2001 |

* cited by examiner

*Primary Examiner*—Minsun Harvey
*Assistant Examiner*—Yuanda Zhang
(74) *Attorney, Agent, or Firm*—Sughrue Mion, PLLC

(57) ABSTRACT

A laser oscillator includes a light condensing block having a through-hole for housing a laser medium, and an aperture for introducing excitation light from an excitation light source module into the through-hole; an end plate fixed to an end of the light condensing block, in which a cooling water channel for leading cooling water to the light condensing block and a cooling water channel for leading cooling water to the excitation light source module are formed; and a flow tube fixed and sealed by the end plate, for forming a cooling water passage for the laser medium; and an excitation light source module in which a cooling water channel, communicating with the water channel for the excitation light source module in the end plate, is formed for cooling its excitation light source.

9 Claims, 6 Drawing Sheets

LASER BEAM TRANSMITTER

TECHNICAL FIELD

The present invention relates to a laser diode (hereinafter, referred to as an LD) excitation solid-state laser device that uses LDs as excitation light sources, and to a light condensing module used for the device.

BACKGROUND ART

In a conventional LD-excitation solid-state laser device, a light condenser for confining the excitation light to the vicinity of the solid-state laser medium, and a flow tube for water-cooling the solid-state laser medium have been directly attached to side plates for supporting the excitation unit. In addition, cooling systems for the LDs and for the solid-state laser medium have been independent, and cooling water only for the solid-state laser medium has been supplied and discharged through the side plates (see Patent Document 1).
Patent Document 1: Japanese Patent Laid-Open No. 277837/2000 (FIG. 4)
Because the conventional LD-excitation solid-state laser device has been configured so that the light condenser for confining excitation light to the vicinity of the solid-state laser medium, and the flow tube for water-cooling the solid-state laser medium are directly attached to the side plates for supporting the excitation unit, there has been a problem in that it is difficult to assemble the excitation unit accurately and easily.

Moreover, cooling-water piping systems for cooling the LDs that are excitation light sources and for cooling the solid-state laser medium are independent. The cooling water for the solid-state laser medium is supplied and discharged through the side plates that support the excitation units, while in order to cool the LDs, independent piping must be provided to supply and discharge cooling water. Therefore, there has been a problem in that the conventional LD-excitation solid-state laser device requires piping components in accordance with the plurality of cooling systems, and consequently the number of components and assembly man-hours increase.

Furthermore, there has been another problem in that piping units for supplying cooling water lead to water leakage, and to decline in the reliability of the LD-excitation solid-state laser device.

DISCLOSURE OF THE INVENTION

The present invention has been made to resolve such problems, and aims to realize a light condensing module that is easy to assemble, and does not require piping for supplying cooling water for LD modules, and an LD-excitation solid-state laser device that incorporates the light condensing module.

In order to achieve the object, according to the first aspect, an LD-excitation solid-state laser device includes: a light condensing block having a through-hole for housing a laser medium, and an aperture for introducing excitation light from an excitation light source module into the through-hole; an end plate fixed to an end of the light condensing block, in which a cooling water channel for leading cooling water to the light condensing block and a cooling water channel for leading cooling water to the excitation light source module are formed; a flow tube, fixed and sealed by the end plate, for forming a cooling water passage for the laser medium; and an excitation light source module in which a cooling water channel, communicating with the cooling water channel for the excitation light source module in the end plate, is formed for cooling its excitation light source.

Moreover, the excitation light source module is fixed to the end plate with a fixing means.

Furthermore, supply of cooling water into the light condensing block is fed through a front face of the end plate into the flow tube, and supply of cooling-water into the excitation light source module is fed bypassed from the front face of the end plate to the side face of the end plate.

Moreover, a cooling-water supplying inlet for allowing flow into the light condensing block is provided in the end plate, to cool the light condensing block with cooling water from the end plate.

Furthermore, an LD-excitation solid-state laser device includes: a light condensing block having a through-hole for housing a solid-state laser medium, and an aperture for introducing excitation light from an excitation light source module into the through-hole; a water supplying plate fixed to one end of the light condensing block, in which a cooling water channel for leading cooling water to the light condensing block and a cooling water channel for leading cooling water to the excitation light source module are formed; a water discharging plate, fixed to the other end of the light condensing block, in which a water discharging channel for discharging cooling water that has cooled the light condensing block and a water discharging channel for discharging cooling water that has cooled the excitation light source module are formed; a flow tube, fixed and sealed by the water supplying plate and the water discharging plate, for forming a cooling water passage for the solid-state laser medium; an excitation light source module in which a cooling water channel, communicating with the water channel for the excitation light source module in the water supplying plate and with the water channel for the excitation light source module in the water discharging plate, is formed for cooling its excitation light source; side plates, fixing both ends of the the light condensing block, in which a water supply coupling and a water discharge coupling for cooling water each are provided; and solid-state laser medium fixing plugs for fixing both ends of the solid-state laser medium and sealing flow channels for supplied/discharged cooling water, within spaces enclosed by the fixing plugs together with the side plates.

Moreover, one of the side plates is formed integrally with the water supplying plate, and the other side plate is formed integrally with the water discharging plate, and each of the solid-state laser medium fixing plugs, each side plate, and the light condensing block are fastened by a single fastening means.

Furthermore, a ceramic is used as a diffusely reflecting material for the light condensing block.

BEST MODE FOR CARRYING OUT THE INVENTION

Embodiment 1

Figure 1:
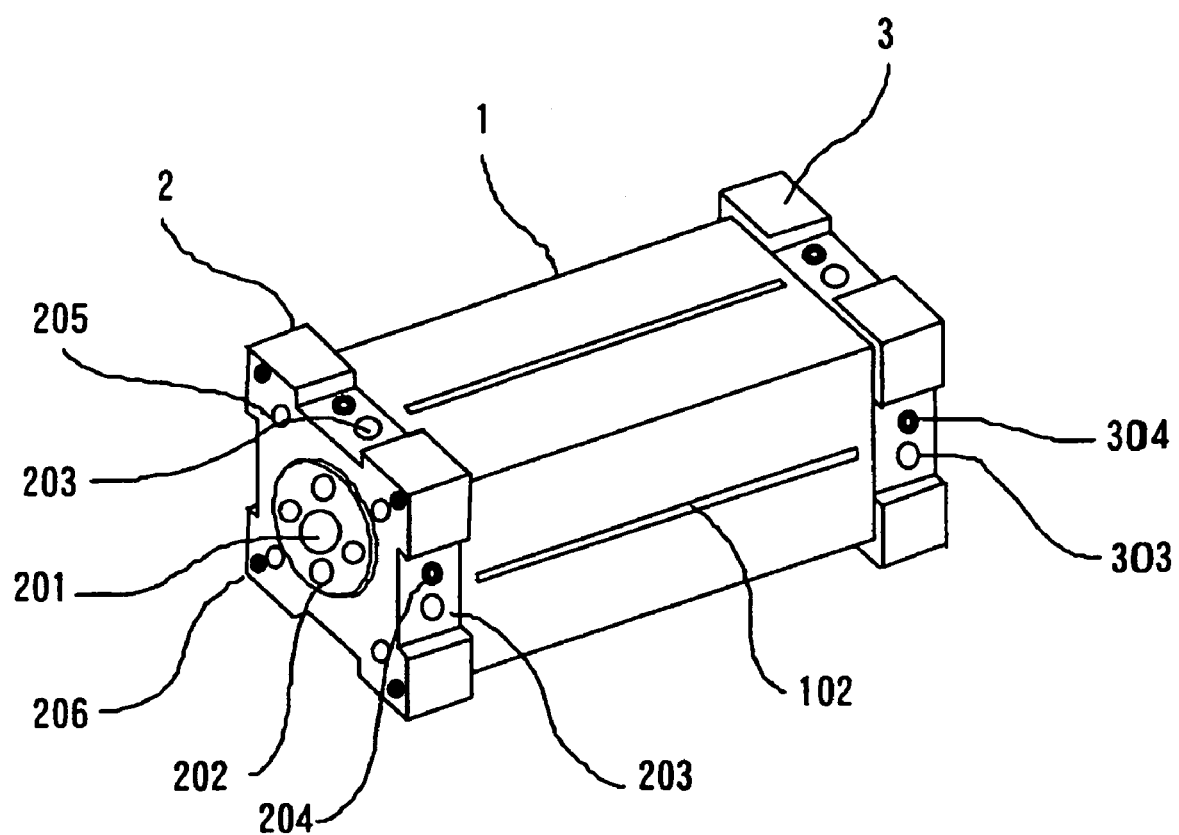
FIG. 1 is a perspective view illustrating a light condensing module in Embodiment 1 of the invention.

FIG. 1 is a perspective view illustrating a light condensing module in Embodiment 1 of the invention.

In FIG. 1, a light condensing block 1 having a form of a quadratic prism is configured with a diffusely reflecting material composed of a ceramic. Slit apertures 102 are provided on four side faces of the light condensing block 1.

A rod water-supplying inlet 201 and LD water-supplying inlets 202 are provided in the central portion of a water supplying plate 2 fixed to one end of the light condensing block 1, and an LD cooling-water outlet 203 is provided in each of the side faces thereof. Flow channels are formed within the water supplying plate 2 so that the LD water-supplying inlets 202 and the LD cooling-water outlets 203 are connected. In addition, in the water supplying plate 2, LD fixing screw holes 204 for fixing LD modules, which are excitation light sources, light-condenser fixing holes 205 for fixing the light condensing block 1 to the water supplying plate 2, and side-plate fixing holes 206 for combining with a water supplying/discharging side plate are formed.

Numeral 3 denotes a water discharging plate fixed to the other end of the light condensing block 1, having a form and a structure symmetrical to the water supplying plate 2. In the water discharging plate, rod water-discharging outlets 301 corresponding to the rod water-supplying inlets 201 in the water supplying plate 2, and LD water-discharging outlets 302 corresponding to the LD water-supplying inlets 202 are formed. LD cooling-water inlets 303 are provided on the side faces of the water discharging plate 3, and LD fixing screw holes 304 and light-condenser fixing holes 305 are formed in the water discharging plate 3.

Figure 2:
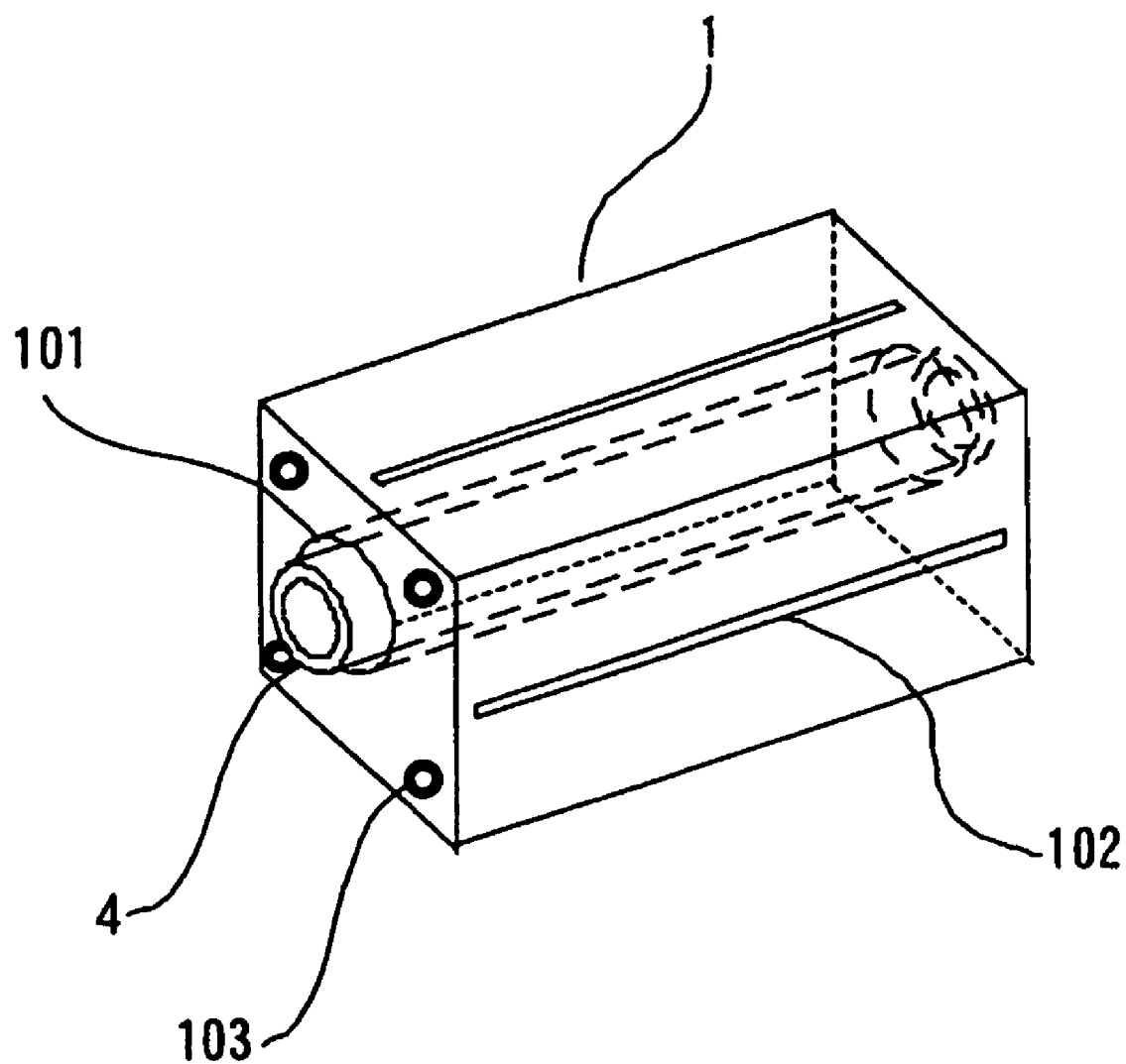
FIG. 2 is a perspective view illustrating a detailed structure of a light condensing block in Embodiment 1 of the invention.

FIG. 2 is a perspective view illustrating a detailed structure of the light condensing block 1 used in the light condensing module illustrated in Embodiment 1 of the invention. In FIG. 2, numeral 101 denotes a through-hole that penetrates through the center of the light condensing block 1, and slit apertures 102 provided in the side faces of the light condensing block 1 are formed so as to reach the through-hole 101. Numeral 103 denotes water-supplying-plate fixing screw holes formed in one end of the light condensing block, for fixing the water supplying plate 2. In the other end of the light condensing block 1, water-discharging-plate fixing screw holes for fixing the water discharging plate 3 are formed. The screw holes correspond to light-condenser fixing holes 205 and 305, respectively.

Numeral 4 denotes a flow tube installed within the through-hole 101 of the light condensing block 1. The flow tube is composed of a material transparent with respect to the wavelength of the LDs used as excitation light sources. In the present embodiment, quartz is used as a material of the flow tube 4. Moreover, both ends of the flow tube 4 are sealed and fixed by the water supplying plate 2 and the water discharging plate 3.

Figure 3:
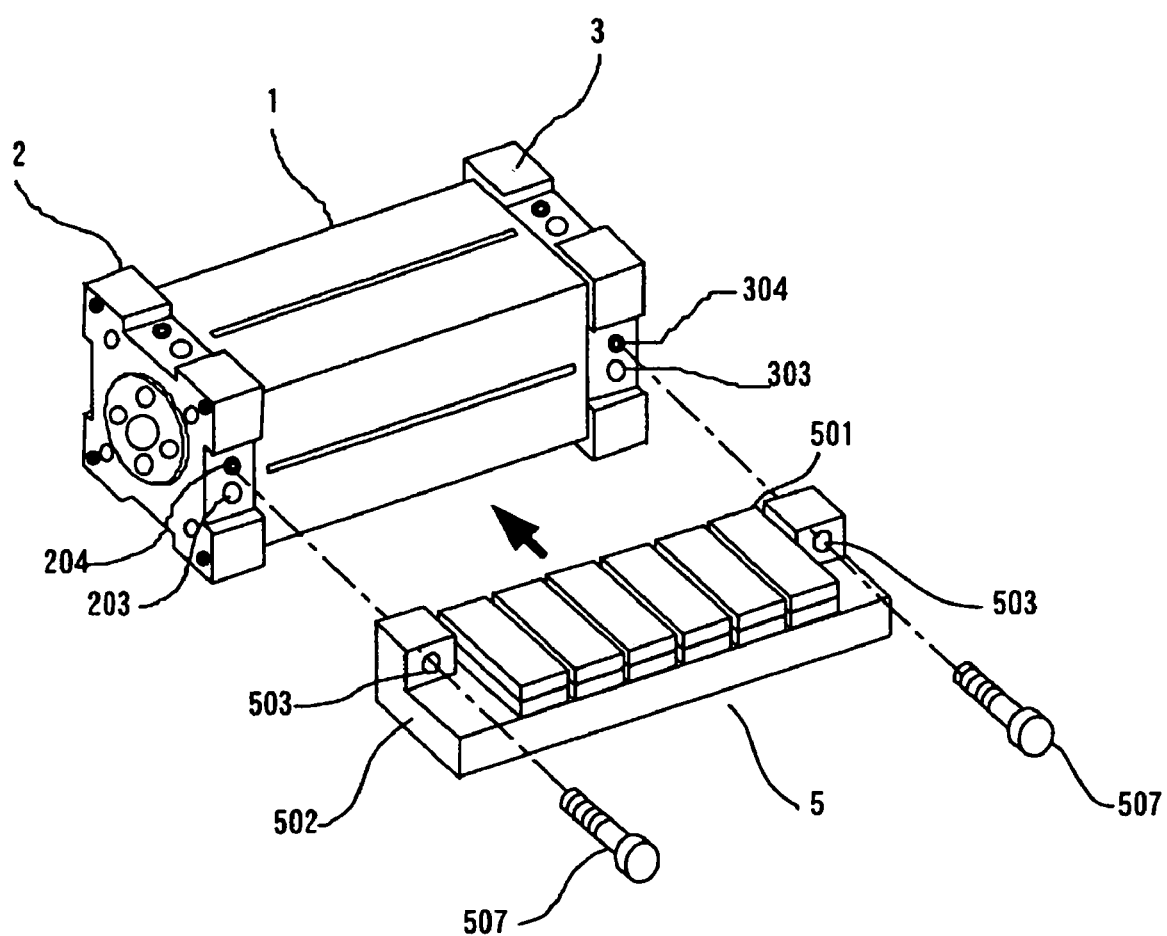
FIG. 3 is a perspective view illustrating a method of fixing an LD module, which is an excitation light source, to the light condensing module in Embodiment 1 of the invention.

FIG. 3 is a perspective view illustrating a method of fixing an LD module, which is an excitation light source, to the light condensing module illustrated in FIG. 1. In FIG. 3, in the LD module 5, which is an excitation light source, a plurality of (six in the embodiment) LD packages 501 configured by coupling LD bars, which are light emitting unit main bodies, is fixed in parallel on a water-cooling heat sink. The water-cooling heat sink in the LD package 5 is supplied with cooling water from a manifold 502. Moreover, LD fixing holes 503 for fixing the LD module 5 to the light condensing module 1 are formed in the manifold 502, which is fastened by LD fixing bolts 507 being screwed into an LD fixing screw hole 204 in the water supplying plate 2 and an LD fixing screw hole 304 in the water discharging plate 3. At this time, the light emitting unit in the LD module 5 and the slit aperture 102 in the light condensing block 1 are positioned so as to face each other, and excitation light emitted from the LD module 5 passes through the slit aperture 102 into the through-hole 101 in the light condensing block 1 illustrated in FIG. 2.

Furthermore, flow channels of cooling water are formed within the manifold 502 in the LD module 5, and cooling water is channeled from the LD cooling-water outlet 203 in the water supplying plate 2 through the flow channel within the manifold to the water-cooling heat sink in the LD package 501. Then, the cooling water that has cooled the LD package 501 is discharged through the flow channel within the manifold into the LD-cooling-water inlet 303 in the water discharging plate 3.

In addition, although a method of fixing an LD module 5 to only one side face of the light condensing module is illustrated in FIG. 3, other LD modules 5 are also fixed to the remaining three side faces according to the identical method.

Figure 4:
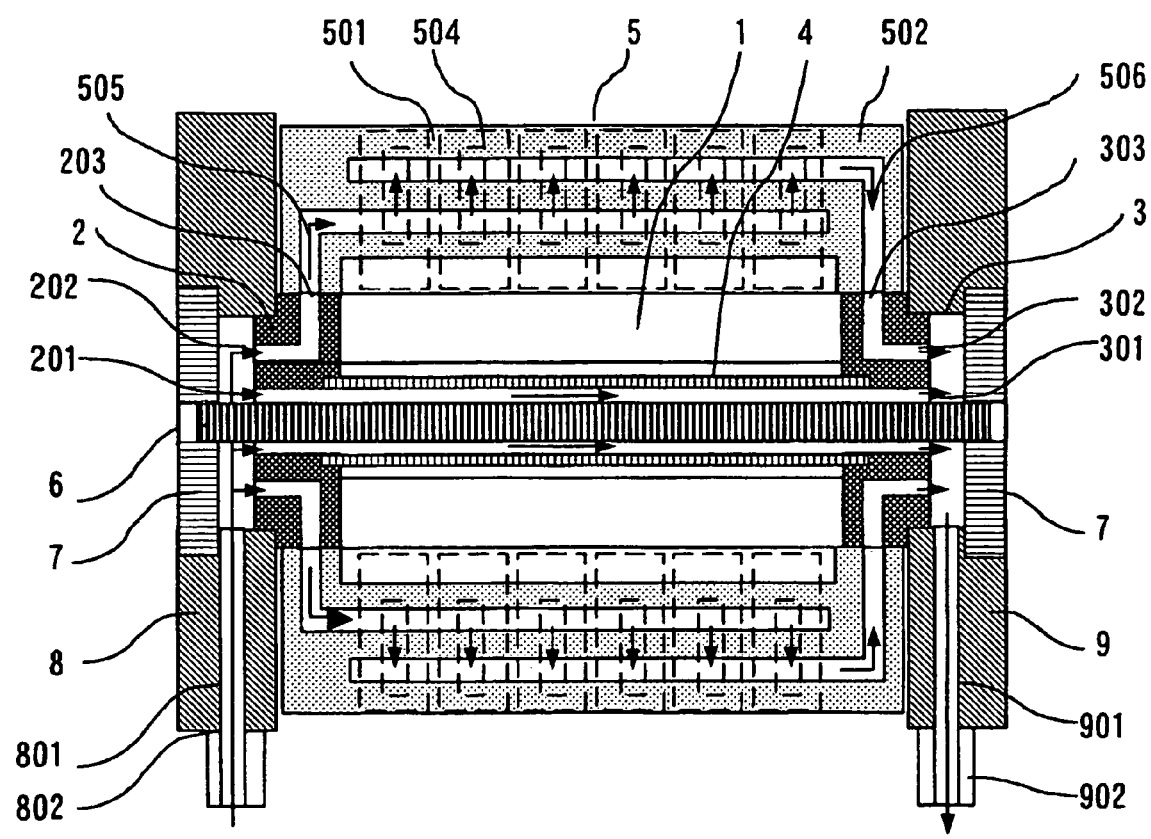
FIG. 4 is a cross-sectional schematic diagram illustrating a structure of an LD-excitation solid-state laser device using the light condensing module and the LD modules in Embodiment 1 of the invention.

FIG. 4 is a cross-sectional schematic diagram illustrating a structure of an LD-excitation solid-state laser device for exciting a solid-state laser medium, including the light condensing module and the LD modules illustrated in FIG. 1 through FIG. 3. In the embodiment, YAG (yttrium aluminium garnet) crystal doped by Nd (neodymium) as an activating medium is used for a rod-type solid-state laser medium 6. Rod fixing plugs 7 for sealing cooling water fix both ends of the solid-state laser medium 6. A water-supplying side plate 8 is provided to support one end of the light condensing module, and to supply cooling water into the light condensing module. A water-supplying flow channel 801 for supplying cooling water is formed within the water-supplying side plate, and a water supply coupling 802 is provided at a water-supplying channel inlet on the side face of the water-supplying side plate 8. A water-discharging side plate 9 is provided to support the other end of the light condensing module, and to discharge cooling water. A water-discharging flow channel 901 for discharging cooling water is formed within the water-discharging side plate, and a water discharge coupling 902 is provided at a water-discharging channel outlet on the side face of the water-discharging side plate 9. In addition, numeral 504 denotes cooling-water flowpaths schematically illustrated in dashed line, which is formed within the LD package 501 illustrated also in dashed line. A cooling-water supplying channel 505 and a cooling-water discharging channel 506 are formed within the manifold 502.

In FIG. 4, flows of cooling water in the LD-excitation solid-state laser device are illustrated with arrows for explanation. The cooling water supplied from the water supply coupling 802 in the water-supplying side plate 8 flows through the water supplying channel 801 up to the water supplying plate 2 at the end of the light condensing module.

The cooling water that has reached the water supplying plate 2 is distributed to the rod water-supplying inlet 201 and the LD water-supplying inlet 202. The cooling water that has flowed into the rod water-supplying inlet 201 flows through the gap between the outer face of the solid-state laser medium 6 and the flow tube 4 up to the water discharging plate 3 at the other end of the light condensing module, while cooling the solid-state laser medium 6, and then is discharged from the rod water-discharging outlet 301 to the outside of the light condensing module. Meanwhile, the cooling water that has flowed into the LD water-supplying inlet is supplied from the LD cooling-water outlet 203 to the cooling-water supplying channel 505 formed within the manifold 502 in the LD module 5. The cooling water in the cooling-water supplying channel 505 is discharged through the cooling-water flow channel 504 within the heat sink in the LD package 501 into the cooling-water discharging channel 506. Here, the LD package 501 is effectively cooled, when the cooling water passes through the cooling-water flow channel 504. After that, the cooling water discharged to the cooling-water discharging channel 506 flows into the cooling-water inlet 303 provided in the water discharging plate 3 of the light condensing module, and then is discharged from the LD water-discharging outlet 302 in the water discharging plate 3 to the outside of the light condensing module. The cooling water that has cooled the LD module 5 and the solid-state laser medium 6 and that has been discharged to the outside of the light condensing module flows through the water-discharging flow channel 901 in the water-discharging side plate 9, and is discharged from the water discharge coupling 902 to the outside of the LD-excitation solid-state laser device.

Meanwhile, the excitation light emitted from the LD module 5 passes through the slit aperture 102 provided on the side face of the light condensing block 1 into the through-hole 101 in the light condensing block 1, and excites the solid-state laser medium 6 via the flow tube 4 and the cooling water. Inverted distribution corresponding to laser levels is formed within the excited solid-state laser medium 6, and a laser beam can be taken out from the excited solid-state laser medium 6 by disposing at both ends of the solid-state laser medium 6 light resonators composed of a total reflection mirror and a partial reflection mirror. In addition, because the excitation light emitted from the LD module 5 is effectively confined within the through-hole 101 of the light condensing block 1, most of the excitation light is absorbed in the solid-state laser medium 6 so that the solid-state laser medium 6 can be efficiently excited. In the embodiment, because a ceramic, which is a diffusely reflecting material, is used as a material for the light condensing block 1, it becomes easy to uniformly excite the solid-state laser medium 6 to efficiently generate a highly-concentrated laser beam.

In the light condensing module described in the embodiment, the slit apertures 102 for introducing excitation light into the through-hole 101 of the light condensing block are provided on the side faces of the light condensing block 1, the water supplying plate 2 and the water discharging plate 3 are disposed at both ends of the light condensing block 1, and the means for fixing LD modules 5 are provided in the side faces of the water supplying plate 2 and the water discharging plate 3, whereby the light emitting units in the LD modules 5, which are excitation light sources, can be disposed easily and accurately with respect to the slit apertures 102 of the light condensing block 1, excitation light can be efficiently introduced into the through-hole 101 of the light condensing block 1, and consequently the solid-state laser medium 6 can be efficiently and uniformly excited, so that a highly-concentrated laser beam can be stably generated.

In addition, the LD water-supplying inlet 202 and the LD water-discharging outlet 302 are provided on the front faces of the water supplying plate 2 and the water discharging plate 3, the LD cooling-water outlets 203 communicating with the LD water-supplying inlets are provided on the side faces of the water supplying plate 2, and the LD cooling-water inlets 303 communicating with the LD water-discharging outlets 302 are provided on the side faces of the water discharging plate 3, whereby the light condensing module is configured so that cooling water is directly supplied and discharged through the LD cooling-water outlets 203 and the LD cooling-water inlets 303 to the manifolds 502 in the LD modules 5, and consequently, cooling water can be supplied and discharged to the LD module with a simple configuration. Moreover, because it is not necessary to provide special piping or the like for supplying cooling water to and discharging it from the LD module, the number of components of the LD-excitation solid-state laser device and assembly man-hours thereof are reduced, and reduction in manufacturing costs can be achieved. Furthermore, because piping or the like for supplying cooling water to the LD module 5 is not required, the reliability with respect to leakage of cooling water can also be enhanced. In addition, because pressure loss across the water channel when supplying cooling water to the LD module is reduced, performance requirements to a pump for supplying cooling water are reduced, so that downsizing of a cooling-water supplier and reduction in manufacturing costs can be achieved.

Furthermore, if an LD-excitation solid-state laser device is configured so that one end of the light condensing module is supported by the water-supplying side plate 8, within which the water-supplying flow channel 801 is provided, the other end thereof is supported by the water-discharging side plate 9, within which the water-discharging flow channel 901 is provided, and the solid-state laser medium 6 is fixed and sealed to the water-supplying side plate 8 and the water-discharging side plate 9 using the rod fixing plugs 7; and if cooling water is supplied and discharged with respect to the solid-state laser medium 6 and the LD modules 5 through the water-supplying flow channel 801 of the water-supplying side plate 8 and the water-discharging flow channel 901 of the water-discharging side plate 9; then, without dividing the cooling system for supplying water from outside to the LD-excitation solid-state laser device into a cooling system for the solid-state laser medium 6 and a cooling system for the LD modules, only a single system can supply and discharge cooling water to the both; whereby the configuration of the laser cooling system using the LD-excitation solid-state laser device can be simplified, reduction in manufacturing costs can be achieved and the reliability can be enhanced.

Moreover, it would be obvious that the flow volumes of cooling-water to the solid-state laser medium 6 and the LD modules 5 can be adjusted to desired flow volumes for distribution, in accordance with cross-sectional areas of the flow channels related to cooling-water supply and discharge, including the rod water-supplying inlet 201 and the rod water-discharging outlet 301 provided in the water supplying plate 2 and the water discharging plate 3, the LD water-supplying inlets 202 and the LD water-discharging outlets 302, and the cooling-water supplying channels 505 and the water discharging channels 506 within the manifolds 502 in the LD modules 5.

Embodiment 2

Figure 5:
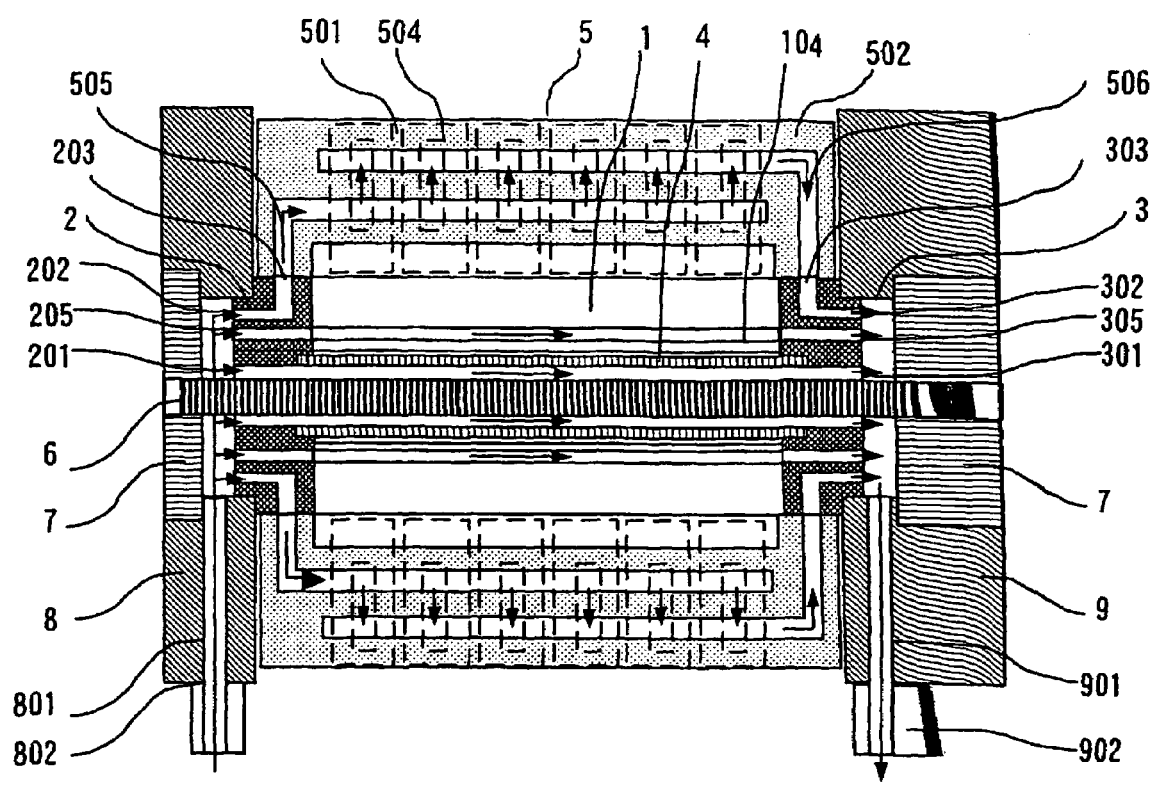
FIG. 5 is a cross-sectional schematic diagram illustrating a structure of an LD-excitation solid-state laser device in Embodiment 2 of the invention.

FIG. 5 is a cross-sectional schematic diagram illustrating a structure of an LD-excitation solid-state laser device in Embodiment 2 of the invention. A light condensing module and an LD-excitation solid-state laser device according to the present embodiment have configurations similar to those in the LD-excitation solid-state laser device in Embodiment 1, illustrated in FIG. 4. In addition to that, a light-condensing-block water-supplying inlet 205 is provided in the water supplying plate 2, and a light-condensing-block water-discharging outlet 306 is provided in the water discharging plate 3; and a light-condenser cooling-water flow channel 104, which is a through-hole, is provided in the light condensing block 1 at a position corresponding to the light-condensing-block water-supplying inlet 205 in the water supplying plate 2, and to the light-condensing-block water-discharging outlet 306 in the water discharging plate 3. In the embodiment, cooling water is supplied and discharged, through the water supplying plate 2 and the water discharging plate 3, with respect to the light condensing block 1, together with the solid-state laser medium 6 and the LD modules 5, to perform water-cooling of the light condensing block 1.

In the light condensing module according to the embodiment, not only the same effects as in the light condensing module in Embodiment 1 can be achieved, but also, because the light condensing block 1 can be water-cooled, heat generation from the light condensing block 1 due to absorption of excitation light can be effectively suppressed, and thermal deformation of the light condensing block can be suppressed, so that the solid-state laser medium can be stably excited at all times. Moreover, because heat generation from the light condensing block 1 can be effectively suppressed, thermal deformation can be suppressed, reflectance of the inner face of the through-hole 101 in the light condensing block 1 can be prevented from deteriorating, and a high confining effect of excitation light can be maintained at all times, so that the solid-state laser medium 6 can be efficiently excited; whereby the reliability of the LD-excitation solid-state laser device can be enhanced.

Furthermore, because cooling water for the light condensing block 1 is also supplied and discharged through the water supplying plate 2 and the water discharging plate 3, it is not necessary to provide piping or the like separately for water-cooling of the light condensing block 1, reliability with respect to leakage of water is enhanced, and the number of components and man-hours can be reduced, so that reduction in manufacturing costs can be achieved.

Embodiment 3

Figure 6:
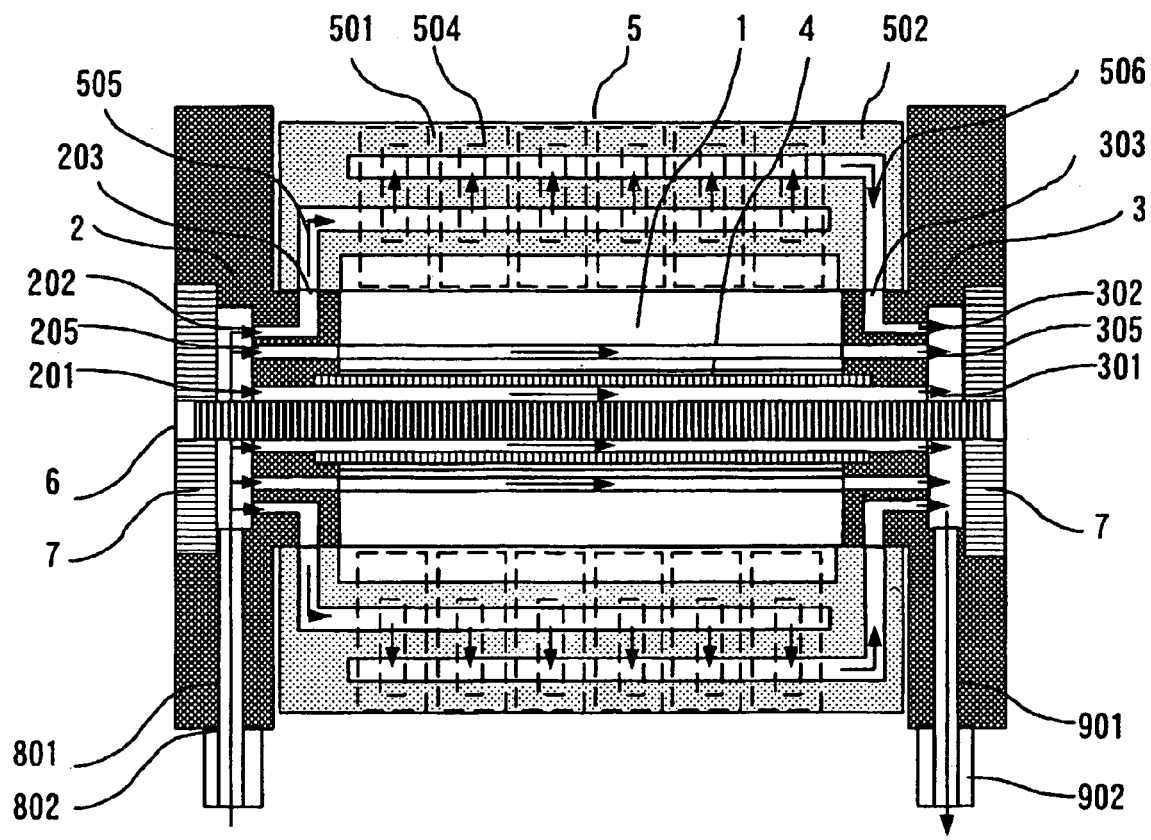
FIG. 6 is a cross-sectional schematic diagram illustrating a structure of an LD-excitation solid-state laser device in Embodiment 3 of the invention.

FIG. 6 is a cross-sectional schematic diagram illustrating a structure of an LD-excitation solid-state laser device in Embodiment 3 of the invention. In the present embodiment, the LD-excitation solid-state laser device has a configuration in which the water supplying plate 2 serves also as the water-supplying side plate 8, and the water discharging plate 3 serves also as the water-discharging side plate 9. The configuration is similar to that in Embodiment 2. As described in the present embodiment, with the configuration in which the water supplying plate 2 serves also as the water-supplying side plate 8, and the water discharging plate 3 serves also as the water-discharging side plate 9, not only the same effects as in Embodiment 2 described above can be achieved, but also further reduction of the number of components and assembly man-hours is made possible, so that reduction in the manufacturing costs can be achieved. In addition, an installation accuracy of the solid-state laser medium 6 with respect to the light condensing module is enhanced, and the risk of water leakage at the joint between the water supplying plate 2 and the water-supplying side plate 8, and at the joint between the water discharging plate 3 and the water-discharging side plate 9 is eliminated, whereby the reliability of the LD-excitation solid-state laser device can be further enhanced.

Moreover, although, in the embodiments described above, the configurations for exciting the solid-state laser medium 6, in which the light condensing block 1 having a form of a quadratic prism is used, and the LD modules 5 are disposed on the four side faces of the light condensing block 1, have been described, the form of the light condensing block and the number of LD modules are not limited to those. For example, in a case in which eight LD modules are used, if a light condensing block having a form of an octagonal prism is used, and the LD modules are disposed on eight side faces of the light condensing block, then, not only the same effects as in the above-described embodiments can be achieved, but also the solid-state laser medium can be excited to a high density so that the laser beam can be further efficiently taken out, and the output power can be effectively increased with the simple and compact configuration being maintained. Furthermore, if an odd number of LD modules and a light condensing block having a form of an odd-number-polygonal prism are used, irradiating light from the LD module disposed facing across the light condensing block can be avoided, and the reliability of LD modules can be enhanced.

Moreover, in the embodiments described above, the configurations in which a rod-type YAG crystal is used for a solid-state laser medium have been described. However, it would be obvious that the kind and the form of solid-state laser media are not limited to those, but a slab-type solid-state laser medium, for example, can also be used to achieve similar effects.

Furthermore, in the embodiments described above, the configurations having a cylindrical through-hole at the center of the light condensing block have been described. However, as long as excitation light can be effectively confined, the form of the through-hole is not limited to that.

INDUSTRIAL APPLICABILITY

As described above, the invention is suitable to be used for a laser oscillator including an LD-excitation solid-state laser device in which laser diodes are used as excitation light sources.

What is claimed is:

1. A laser oscillator comprising:
   an excitation light source module in which a cooling water channel for cooling its excitation light source is formed;
   a light condensing block having a through-hole for housing a laser medium, and an aperture for introducing into the through-hole excitation light from the excitation light source module;
   an end plate fixed to an end of the light condensing block, in which a cooling water channel for leading cooling water to the light condensing block and a cooling water channel for leading cooling water to the excitation light source module are formed; and
   a flow tube, fixed and sealed by the end plate, for forming a cooling water passage for the laser medium; wherein an aperture of the cooling water channel on the excitation-light-source-module side of the end plate, communicating with the cooling water channel formed in the excitation light source module, is provided on a side face of the end plate, the excitation light source module is fixed to the end plate with a fixing means, and supply of cooling water into the light condensing block is fed through a front face of the end plate into the flow tube, and supply of cooling-water into the excitation light source module is fed bypassed from the front face of the end plate to the side face of the end plate.

2. A laser oscillator according to claim 1, wherein a cooling-water supplying inlet for allowing flow into the light condensing block is provided in the end plate, to cool the light condensing block with cooling water from the end plate.

3. A laser oscillator comprising:

an excitation light source module in which a cooling water channel for cooling its excitation light source is formed;

a light condensing block having a through-hole for housing a solid-state laser medium, and an aperture for introducing into the through-hole excitation light from the excitation light source module;

a water supplying plate fixed to one end of the light condensing block, in which a water supplying channel for leading cooling water to the light condensing block and a water supplying channel for leading cooling water to the excitation light source module are formed;

a water discharging plate, fixed to the other end of the light condensing block, in which a water discharging channel for discharging cooling water that has cooled the light condensing block and a water discharging channel for discharging cooling water that has cooled the excitation light source module are formed;

a flow tube, fixed and sealed by the water supplying plate and the water discharging plate, for forming a cooling water passage for the solid-state laser medium;

side plates, fixing both ends of the light condensing block, in which a water supply coupling and a water discharge coupling for cooling water are provided, respectively; and solid-state laser medium fixing plugs for fixing both ends of the solid-state laser medium and sealing flow channels for supplied/discharged cooling water, within spaces enclosed by the fixing plugs together with the side plates; wherein an aperture of the water supplying channel on the excitation-light-source-module side of the water supplying plate, communicating with the cooling water channel formed in the excitation light source module, is provided on a side face of the water supplying plate, and an aperture of the water discharging channel on the excitation-light-source-module side of the water discharging plate, communicating with the cooling water channel formed in the excitation light source module, is provided on a side face of the water discharging plate.

4. A laser oscillator according to claim 3, wherein one of the side plates is formed integrally with the water supplying plate, and the other side plate is formed integrally with the water discharging plate, and each of the solid-state laser medium fixing plugs, each side plate, and the light condensing block are fastened by a single fastening means.

5. A laser oscillator according to claim 1, wherein a ceramic is used as a diffusely reflecting material for the light condensing block.

6. A laser oscillator according to claim 2, wherein a ceramic is used as a diffusely reflecting material for the light condensing block.

7. A laser oscillator according to claim 3, wherein a ceramic is used as a diffusely reflecting material for the light condensing block.

8. A laser oscillator according to claim 4, wherein a ceramic is used as a diffusely reflecting material for the light condensing block.

9. A laser oscillator according to claim 3, wherein:

the excitation light source module is fixed to the water supplying plate with a fixing means, and supply of cooling water into the light condensing block is fed through a front face of the water supplying plate into the flow tube, and supply of cooling-water into the excitation light source module is fed bypassed from the front face of the water supplying plate to the side face of the water supplying plate.

* * * * *